United States Patent [19]

Smith

[11] 3,887,344

[45] June 3, 1975

[54] SELF-CLEANING FILTER

[76] Inventor: Randall E. Smith, Rt. 10, Box 312, Spartanburg, S.C. 29303

[22] Filed: Nov. 19, 1973

[21] Appl. No.: 417,418

[52] U.S. Cl. ............... 55/294; 55/296; 55/301; 285/9 R; 285/405
[51] Int. Cl. ............................................ B10d 46/24
[58] Field of Search ......... 55/96, 97, 282, 288, 290, 55/293, 294, 295, 296, 301, 302, 400, 491, 291; 210/411, 415; 285/405, 9 R, 164, 165, 272, 275; 308/238; 209/452

[56] References Cited

UNITED STATES PATENTS

| 964,377 | 7/1910 | Blass | 55/400 |
|---|---|---|---|
| 1,497,176 | 6/1924 | James | 209/452 |
| 1,995,648 | 3/1935 | Rathbun | 55/294 |
| 1,995,649 | 3/1935 | Rathbun | 55/294 |
| 2,275,958 | 3/1942 | Hagel | 210/411 X |
| 3,400,988 | 9/1968 | Hudson et al. | 308/238 |
| 3,502,380 | 3/1970 | Adinoff | 308/238 |
| 3,757,496 | 9/1973 | Berg | 55/294 |

FOREIGN PATENTS OR APPLICATIONS

| 16,392 | 5/1912 | United Kingdom | 55/294 |

Primary Examiner—Frank W. Lutter
Assistant Examiner—David L. Lacey
Attorney, Agent, or Firm—Wellington M. Manning, Jr.

[57] ABSTRACT

A stationary drum type filter is disclosed and claimed herein having a self-cleaning capability. A cylindrical housing having one closed end and one open end is provided with filter media at least partly around the circumference thereof and preferably completely around the circumference thereof. The filter media preferably has at least one area thereacross that extends outwardly, away from suction nozzles so as to permit large dirt particles, accumulations, and the like to be received therein and removed by suction nozzles passing thereover. A suction manifold is rotatably received in the closed end of the filter and sealed thereat while likewise being rotatably supported at the open end of the filter by a plurality of roller supports. At the open end of the filter the manifold is connected to a suction source where it is sealed by rotary self-sealing means. At least one, but preferably a plurality of suction nozzles are spaced along the length of the manifold equidistant therearound so as to provide balance thereto. The suction nozzles reside immediately adjacent the filter media so as to automatically clean same during rotation of the manifold. The leading edge of the nozzle is spaced upwardly from the filter media by a distance greater than the trailing edge whereby the trailing edge forces or scoops material upwardly away from the media into the suction force. Method and apparatus claims are included.

15 Claims, 5 Drawing Figures

SELF-CLEANING FILTER

BACKGROUND OF THE INVENTION

Substantial effort has been expended in the area of filtering industrial air so as to improve the work conditions in plants; so as to treat the ambient air and appropriately condition same for a particular process or area; for the general comfort, health and well being of the employees; and other varied reasons. In the textile industry, for example, large amounts of lint, fly and trash are carried by plant air. These particles have been released from fibrous materials in the processes and present operational hazards. Further, these particles have been determined to represent definite health hazards due to inhalation and entrappment in employee's lungs. Likewise, the surroundings are generally uncomfortable when excessive fly, lint and the like are air borne. It has thus become necessary that plant air in the textile and other industries be filtered to remove the undesirable and often dangerous particles therefrom. Large industrial type filters are employed due to the large volume requirements and are of various and sundry types. Periodic cleaning requirements have brought about self-cleaning filters which like the nonself-cleaning filters are represented by varied designs, depending upon the particular environment in which it is to be employed.

The prior art discloses numerous arrangements for self-cleaning, industrial type filters where the dirty air passes from the outside of the filter media, leaving the air borne, unwanted materials on the outside of the filter media. Likewise, certain of the filters direct air inside a filter housing and against the filter media, leaving the unwanted materials on the inside of the filter where it is later manually or automatically stripped from the filter media and discarded. Rectangular, cylindrical and other shaped filters have been employed with suction nozzles passing over the filter media either periodically or according to some geometric scheme to remove the filtered materials and rejuvenate the filter media.

The present invention represents an improvement over the industrial self-cleaning filters of the prior art. A stationary housing in employed that is self-cleaned according to a timed sequence in a very economical and efficient manner that requires little operating cost or maintenance. Filter efficiency is high and very little danger exists in releasing contaminants into the return air. Moreover, the structure per se may be economically provided for the consumer.

There is no known prior art that teaches or suggests the self-cleaning filter of the present invention. Exemplary of the prior art are U.S. Pat. Nos. 1,944,267 to Rathbun; 1,995,648 to Rathbun; 2,591,198 to Ringe; 3,183,647 to Lang; 3,233,391 to Olsen; 3,303,635 to Sherrill; 3,315,446 to King, Jr.; 3,345,805 to Sherrill; 3,377,780 to Noland; 3,505,792 to Dahlem and 3,667,195 to Angilly, Jr. et al.

SUMMARY OF THE INVENTION

It is an object of the present invention to provide an improved self-cleaning drum type air filter.

Another object of the present invention is to provide an improved stationary drum type air filter that has a self-cleaning capability by balanced suction nozzles passing therearound in timed sequence.

Yet another object of the present invention is to provide an improved self-cleaning air filter system having an improved sealing of the exhaust.

Generally speaking, the self-cleaning air filter of the present invention comprises a housing having one closed end and one open end and having a filter media area received at least partially around the circumference thereof; a manifold received centrally of said housing and rotatingly supported thereat; at least one nozzle located along said manifold, said nozzle being in communication with said manifold and residing immediately adjacent an inside wall of said housing; means to rotate said manifold and said nozzle around the interior of said housing whereby substantially all the filter media area of said housing is subjected to said nozzle; and suction producing means in communication with said manifold and said nozzle whereby suction in said nozzle removes unwanted materials from said filter media as said nozzle moves thereby.

More specifically, the filter of the present invention is made up of a horizontally disposed stationary housing that is rigidly supported by a suitable framework or base. Side walls of the housing preferably form a cylinder and are constructed of reinforced wire mesh having filter media received on the inside thereof. A depression, longitudinal slot or the like is preferably provided at least once around the cylinder, the purpose of which will be described hereinafter. The housing of the instant filter is closed on one end and open on an opposite end whereby air entering the open end generally makes an approximate 90° turn through the filter media, thus fostering filter efficiency.

As is conventional in the art, the filter system of the present invention is subjected to suction to draw air to be filtered into the filtering area. Hence, a housing may be constructed around the outside of the present filter and suction created thereon by conventional means or the present filter may be set into a filter room with the open end of the filter extending through a wall and affording an entrance to the filter where the entire room is under a reduced pressure or suction. Both such arrangements are well known to those skilled in the art and form no particular part of the present invention.

A suction manifold is located centrally of the housing and is rotatably supported at the closed end of the housing by a suitable bushing and air seal arrangement thereat. A rod extends from the manifold through the housing end and is in a driven relationship with a suitable motor or other motive power source to afford rotational power to the manifold. The opposite end of the suction manifold is rotatably supported at the open end of the housing and is in a rotary sealed relationship with a source of suction. At least one nozzle is secured to the suction manifold, in communication therewith and is positioned immediately adjacent the filter media. The suction nozzle thus follows rotational movement of the suction manifold and removes filtered contaminants from the filter media to rejuvenate same for continued filtering.

The suction nozzle arrangement finds a preferred plurality of nozzles equidistantly spaced around the suction manifold thus obviating the need for any counterweighting. Suction nozzles are preferably constructed with a nozzle housing having a forward end slightly raised from the surface of the filter media and a trailing end that is proximate the media surface. The trailing end of the housing thus engages contaminants on the filter media and forces, scoops or plows the contaminants upwardly where the contaminants are removed by air suction in the nozzle. Likewise, as the unwanted materials are scooped and forced along with the rotating nozzle, large lumps or the like that may accumulate ahead of the forward end of the nozzle may pass into the depressions as mentioned hereinabove, whereby they may then pass under the leading nozzle edge and can be removed by the force of suction from within the nozzle.

A suitable rotary support means is provided at the open end of the housing to permit unimpeded rotational movement of the suction manifold. At this point, a rotary seal must be provided to permit suction to be drawn on the manifold. Conduit from a source of suction or, reduced air pressure, is provided adjacent the rotary manifold. The conduit is quite preferably provided with self-alignment means between the conduit and the suction manifold along means to afford a rotary air seal therebetween on one of the elements. A preferred embodiment utilizes a collar around the fixed conduit that receives the rotatable manifold and holds the manifold in a sealing arrangement during rotation. The above referred to collar is preferably self-aligning and has a suitable bearing received therein. The fixed conduit is then received in one end thereof while the rotatable manifold is received in the opposite side thereof. A flange is provided immediately adjacent the self-aligning collar and once suction is created, the flange is drawn against the collar creating a rotary seal therebetween.

Time sequence means may be associated with the rotary power means and suction source for the filter of the present invention to actuate said means at particular cyclical intervals. Hence, depending upon the load on the filter, the cleaning cycle may be actuated more or less frequently to generally maintain a clean filter media for a better and more efficient filtering operation.

DESCRIPTION OF THE PREFERRED EMBODIMENTS

Figures 1, 2:
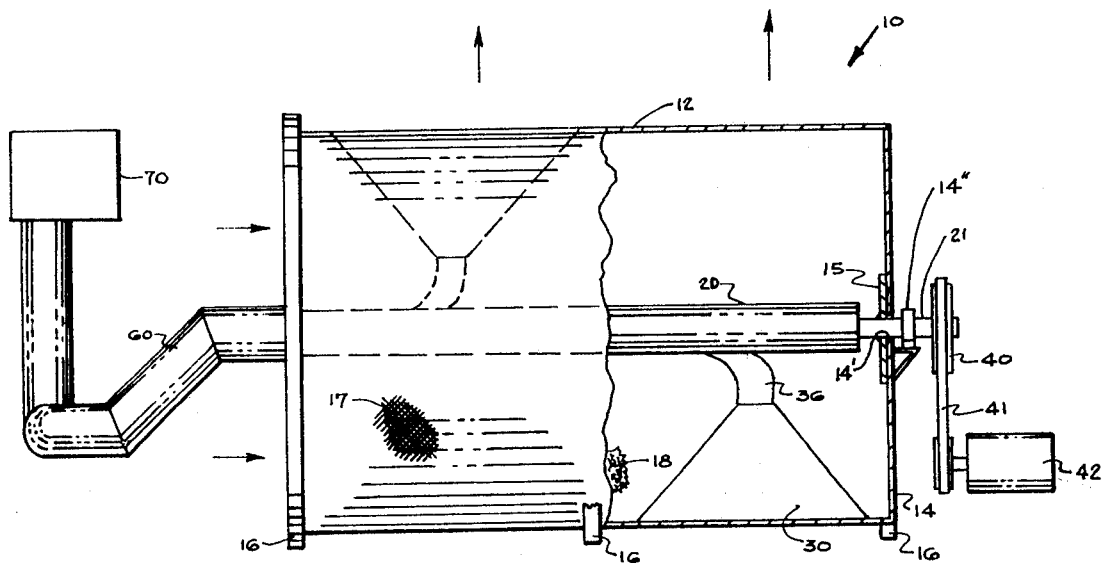
FIG. 1 is a side view of a filter system according to the teachings of the present invention showing same partially in cross section.
FIG. 2 is an isometric view of a nozzle-manifold structure according to the teachings of the present invention.

Making reference to the drawings, preferred embodiments of the present invention will now be described in detail. The filter is generally indicated as 10 and includes a housing 12 having only one end wall 14 and suitable framework 16 for a rigid stationary support thereof. The end of housing 12 opposite end wall 14 is open for the passage of unfiltered air into the housing. A suction manifold generally indicated as 20 is received in housing 12, approximately centrally located and is rotatably supported thereat. Suction manifold 20 as will be described in more detail hereinafter is connected to a source of suction indicated schematically as 70 by a fixed conduit 60 or the like. Suction manifold 20 is provided at one end with a support axel 21 that extends through an appropriate opening 14' provided in end wall 14 of housing 12 and is rotatably supported thereat by a bearing 14'' or the like. A suitable sealing gasket 15 is received at opening 14' along manifold axel 21 to preclude passage of air from within housing 12. Axel or shaft 21 is provided with a suitable sprocket or the like 40 at an outer end thereof. Sprocket 40 receives a driving belt 41 therearound, the other end of which is associated with a motor or other motive power source 42. Rotary power is thus afforded to manifold 20 thereby. An opposite end of manifold 20 is supported within the open intake end of housing 12 while permitting unimpeded rotation thereat, as will be described in more detail hereinafter.

Housing 12 is stationary as mentioned above, and is provided with suitable supports 16 for maintaining same in a proper horizontal disposition. Around the circumference of housing 12 the side wall is preferably a wire mesh 17 having a suitable filter media 18 positioned on the inside thereof. Air therefore enters the open end of housing 12, makes a 90° turn within housing 12 and passes through filter media 18 and wire mesh 17, leaving air borne contaminants entrapped therein. It is necessary to remove the entrapped contaminants from filter media 17 to permit the filter to continue to function properly. Such cleaning may be accomplished manually or automatically. According to the present invention an automatic cleaning system that is provided is both simple and economical, while also representing an improvement over existing air filter systems.

Figure 3:
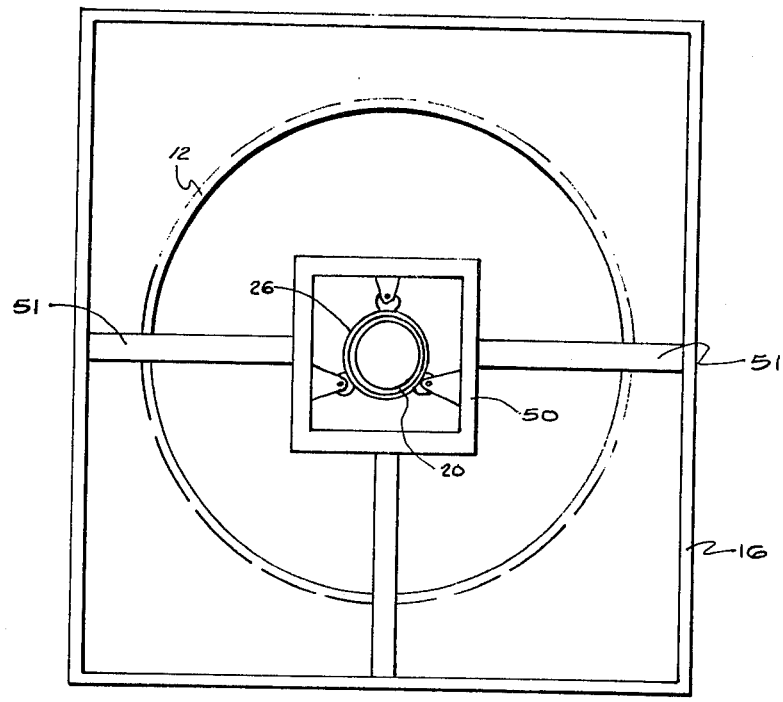
FIG. 3 is an end view of a filter embodying the teachings of the present invention.

Making reference to FIGS. 2 and 3, the suction manifold and nozzles of the present invention will be described in greater detail. As pointed out above, manifold 20 has a shaft 21 secured thereto and extending outwardly therefrom for rotatable support in closed end wall 14 of filter housing 12. The opposite end of manifold 20 as mentioned above is rotatably supported by suitable means in the open end of housing 12. A rectangular frame 50 is secured to framework 16 by suitable struts 51. Frame 50 has a plurality of roller supports 52 positioned in the inside thereof and held thereat by arms 53. Rollers 52 are preferably positioned 120° apart as illustrated whereby three such rollers surround manifold 20 and support same while permitting unimpeded rotation thereat. Manifold 20 is thus rotatably supported at one end by a sealbushion 15 in end wall 14 and at the opposite end by rollers 52.

Suction manifold 20 is provided with at least one, but preferably a plurality of suction nozzles generally indicated as 30 along the length thereof. As shown in FIG. 1 and partially in FIG. 2, two nozzles 30 are provided at 180° apart along the length of manifold 20. Since the two nozzles are equally distributed around manifold 20, counterbalancing of manifold 20 is not required. It is thus preferred that more than one nozzle 30 is employed and that the nozzles be disposed in balanced form around manifold 20, i.e., spaced apart by an amount equal to 360 divided by the number of nozzles 30. As illustrated in FIG. 2, manifold 20 has a support structure 32 rigidly secured thereto at each nozzle location. Nozzle support structure 32 receives a fan shaped housing 34 which is secured thereto and which tapers rearwardly to receive a flexible conduit 36. Conduit 36 connects fan shaped housing 34 with manifold 20 to afford suction in housing 34. Preferably conduit 36 enters manifold 20 at an angle of approximately 45° in the direction of air flow. A smooth air flow is thus fostered through nozzles 30 into manifold 20.

Figure 4:
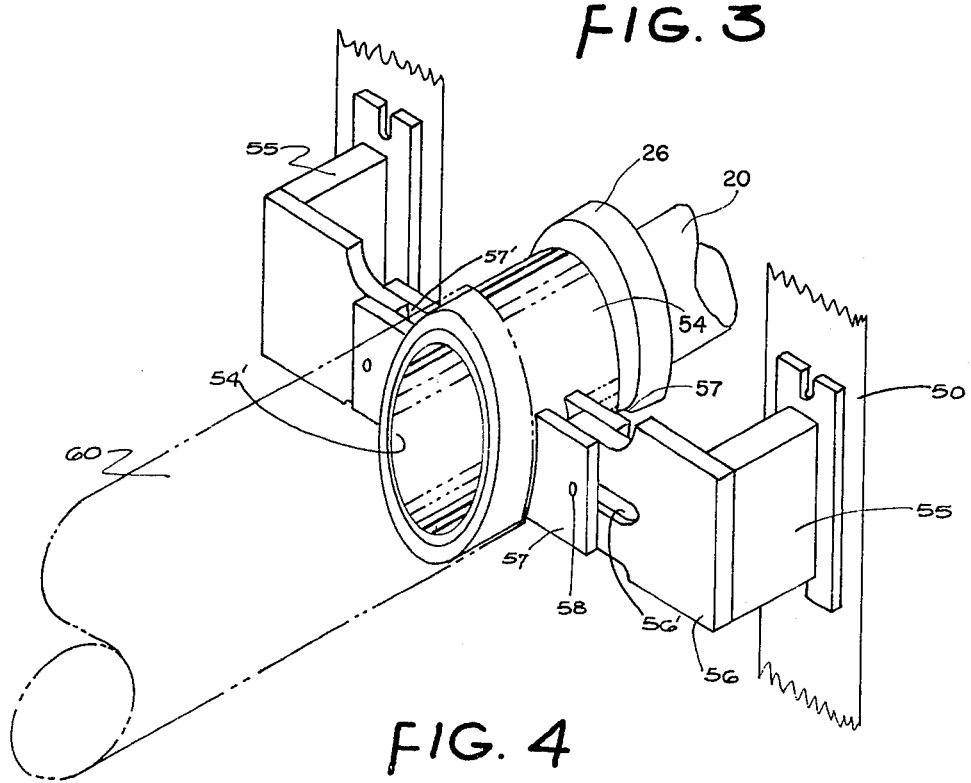
FIG. 4 is an isometric view of a rotary seal collar as described according to a further embodiment of the teachings of the present invention.

Suction manifold 20 requires a rotary seal to permit rotation thereof while maintaining suction within nozzles 30. FIGS. 2 and 4 illustrate a suitable seal according to the teachings of the present invention. A collar 54 is adjustably supported on frame 50 at the open end of housing 12. Standards 55 are secured to frame 50 and extend outwardly therefrom. Collar posts 56 are rigidly secured to standards 55 and extend inwardly toward collar 54. Two legs 57 are secured to opposite sides of collar 54 leaving a space 57' therebetween. Collar posts 56 reside loosely within space 57' between legs 57 with a pin 58 passing through legs 57 and a slot 56' that extends axially with respect to posts 56. Pins 58 thus assure proper alignment of collar 54 while permitting minor lateral movement thereof.

Collar 54 has a bearing surface 54' covering at least a portion of the inner surface thereof. Preferably surface 54' is a bushing of a maintenance free material such as polytetrafluoroethylene which is cast into collar 54. Collar 54 thus receives rigid conduit 60, the outside thereof with manifold 20 extending thereinto from an opposite side. The self-adjustability of collar 54 permits proper alignment between manifold 20 and conduit 60. Furthermore, a suction force is applied through conduit 60 which acts on flange 26 around manifold 20 adjacent collar 54 and cause a tight sealing relationship to be established between collar 54 and flange 26 so long as the suction force remains.

Figure 5:
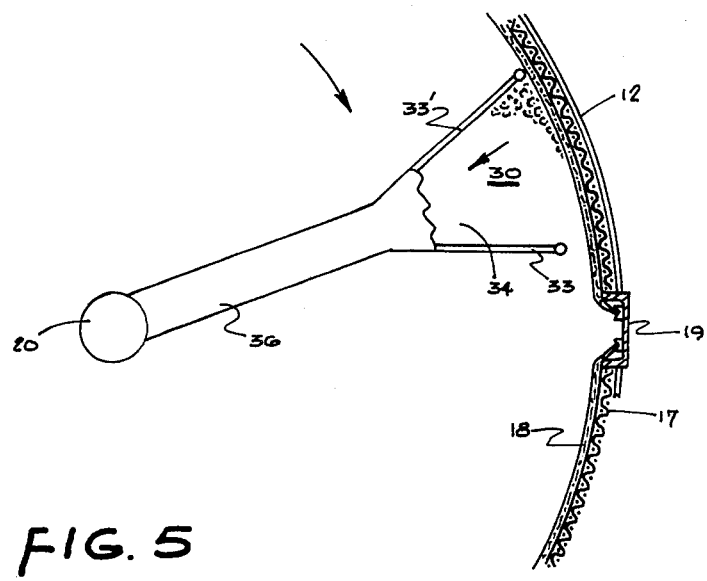
FIG. 5 is a side cross sectional view of a portion of a nozzle and a segment of filter media according to the teachings of the present invention.

In FIG. 5, a portion of housing 12 is illustrated having wire mesh 17 behind which is located a filter media 18. A nozzle 30 rotating in a clockwise direction as shown by the arrow, has a forward side 33 of nozzle housing 34 and a trailing edge 33'. Trailing edge 33' is positioned immediately adjacent filter media 18 and dislodges contaminants filtered from the air that have collected thereat, whereupon once the materials are dislodged and moved upwardly, air suction through nozzle 30 causes the contaminants to be withdrawn from the filter media and exhausted through conduit 20. Leading edge 33 of nozzle housing 34 is offset above filter media 18 so as to permit any enlarged segments of contaminants to pass thereunder and be exhausted via nozzle 30 and manifold 20. Further, in this regard, housing 12 is provided with at least one channel or depression 19 provided around the circumference thereof. Channel 19 preferably serves a dual purpose, in that, fastening means are provided therein for securing filter media around the wire mesh and furthermore channel 19 provides a relief area of sufficient size that large accumulations of waste that are forced ahead of nozzles 30, may pass into channel 19 under nozzles 30 and then be lifted from channel 19 by the force of suction within nozzles 30 and exhaust the system via manifold 20 in a conventional fashion.

Having described the apparatus of the present invention, the operation of same will now be described in detail. The filter 10 is disposed in a desired location and the suction source 70 actuated, causing unfiltered air to be drawn through the open end of filter housing 12 and pass through inside filter media 18 and wire mesh wall 17. Air borne contaminants are thus removed from the air, becoming entrapped on filter media 18. Air entering housing 12 makes a generally 90° turn into filter media 18, thus substantially reducing air velocity at media 18 to permit easier and more effective removal of the air borne contaminants.

Periodically, depending upon the time of operation and/or the amount of load on the filter, it is both necessary and desirable to rejuvenate the filter media. Rotary supported suction manifold 20 and nozzles 30 associated therewith are then actuated by operation of drive means 42 or the like. Entrapped contaminants are then vacuumed from the surface of filter media 18 and are removed from the filter housing 12 via manifold 20. Since the nozzles 30 extend for the entire width of media 18, the inside surface area of media 18 is at least partially cleaned in one revolution of manifold 20 and nozzles 30.

After cleaning of filter media 18, unfiltered air can again be very successfully filtered by the present system. The cleaning system may operate on a timed sequence or continuously as dictated by the particular system employed or area to be maintained.

Having described the present invention in detail, it is obvious that one skilled in the art will be able to make variations and modifications thereto without departing from the scope of the invention. Accordingly, the scope of the present invention should be determined only by the claims appended hereto.

What is claimed is:

1. A self-cleaning air filter comprising:
   a. a stationary cylindrical housing, said housing having one closed end and one end for receiving air to be filtered and having filter media secured therewithin immediately adjacent said housing and at least partially around the circumference thereof, said housing having at least one channel in a wall thereof, said channel extending longitudinally thereof;
   b. a manifold supported for rotation centrally along said housing;
   c. at least one nozzle positioned along said manifold and in communication therewith, said nozzle residing immediately adjacent said filter media inside said housing;
   d. means to rotate said manifold and said nozzle around the interior of said housing whereby substantially all of the filter media around said housing is subjected to said at least one nozzle, said at least one channel in said wall of said housing being of sufficient size to receive accumulations of waste that will not pass between said nozzle and said filter media, whereby said accumulations of waste are forced ahead of said nozzle, fall into said channel, and pass into said nozzle from within said channel; and
   e. suction supply means in communication with said manifold and said at least one nozzle, whereby suction in said nozzle removes said materials from said filter media and said channel as said nozzle moves therearound.

2. A self-cleaning filter as defined in claim 1 wherein a suction conduit connects said manifold to said suction supply means, said manifold and said conduit cooperating to produce a rotary air seal at the junction thereof.

3. A self-cleaning filter as defined in claim 2 wherein a collar is received around an end of said conduit and one end of said manifold is loosely received within said collar, said manifold having a flange therearound adjacent said end, said flange being adjacent said collar whereby suction created in said conduit causes said collar and said flange to cooperate and create said rotary air seal thereat.

4. A self-cleaning filter as defined in claim 3 wherein said collar at the end of said manifold is floating for automatic alignment of said manifold.

5. A self-cleaning filter as defined in claim 1 wherein said manifold is supported at said open end of said housing by a plurality of rollers spaced therearound.

6. A self-cleaning filter as defined in claim 1 wherein said at least one nozzle has a leading edge and a trailing edge adjacent said filter media, said trailing edge being closer to said media to force contaminants away from said media and subject same to suction in said nozzles for removal of same.

7. A self-cleaning filter as defined in claim 1 wherein a plurality of nozzles are provided around said manifold, said nozzles being equally spaced therearound and wherein said manifold is rotatably supported by a plurality of rollers at said open end of said housing, said manifold further having a flange received therearound, said manifold being rotatably received in a suction line collar, whereby said flange and said collar are drawn together by suction to produce a rotary air seal thereat.

8. A self-cleaning filter as defined in claim 7 wherein said collar has a bearing surface on the inside thereof.

9. A self-cleaning filter as defined in claim 8 wherein said bearing surface is a wear resistant plastic cast into place within said collar.

10. A self-cleaning air filter comprising:
   a. a stationary cylindrical housing, said housing having one closed end and one end for receiving air to be filtered and having at least one channel therein extending longitudinally with respect thereto, and having a filter media around the inside of said housing, immediately adjacent thereto, said filter media being secured within said housing at said channel;
   b. a suction manifold supported for rotation at said ends of said housing, said manifold having at least one nozzle secured thereto and in communication therewith, said nozzle having a leading edge and a trailing edge, said leading edge being located away from said filter media to permit passage of materials to be removed thereunder and said trailing edge being immediately adjacent said filter media whereby materials may be lifted from said media into said nozzle;
   c. means to rotate said manifold and said at least one nozzle around the interior of said housing whereby substantially all of the filter media is subjected to said at least one nozzle, said channel in said housing being of sufficient size that large accumulations of material that will not pass under the nozzle will fall therein and then be removed by said nozzle; and
   d. suction supply means in communication with said manifold and said at least one nozzle, whereby suction in said at least one nozzle removes materials from said filter media and channel as said nozzle moves therearound.

11. A self-cleaning air filter as defined in claim 10 wherein a plurality of nozzles are secuted to said manifold, said nozzles being equidistantly spaced therearound.

12. A self-cleaning air filter comprising:
   a. a stationary cylindrical housing, said housing having one closed end and one open end and having a filter media secured therewithin immediately adjacent said housing and extending at least partially around the inner circumference thereof;
   b. a suction manifold supported for rotation at said closed end of said housing and said open end of said housing, said manifold having at least one suction nozzle secured thereto and in communication therwith, said nozzle residing immediately adjacent said filter media, said manifold having a flange therearound adjacent an outer end thereof;
   c. means to rotate said suction manifold and said at least one nozzle around the interior of said housing whereby substantially all of the filter media around said housing is subjected to said at least one nozzle; and
   d. suction supply means connected to said manifold, said suction supply means including a suction conduit and a collar received at an end of said conduit, said collar residing around said outer end of said suction manifold, adjacent said flange, whereby suction in said conduit causes suction between said collar and said flange to create a rotary air seal therebetween.

13. A self-cleaning air filter as defined in claim 12 wherein a plurality of nozzles are provided along said suction manifold, said nozzles being equidistantly spaced around the periphery of said manifold whereby no counter balance is needed thereat.

14. A self-cleaning air filter as defined in claim 13 wherein said frame has slots therein that receive pins attached to said collar, said pins being moveable along said slots to permit said limited lateral movement of said collar.

15. A self-cleaning air filter as defined in claim 12 wherein said collar is secured to a frame at the open end of said filter housing, said collar being capable of limited lateral movement thereat whereby self-alignment is accomplished between said conduit and said manifold.

* * * * *